(12) United States Patent
Kuhara et al.

(10) Patent No.: US 12,346,988 B2
(45) Date of Patent: Jul. 1, 2025

(54) INFORMATION PROCESSING METHOD, INFORMATION PROCESSING DEVICE, AND NON-TRANSITORY COMPUTER-READABLE RECORDING MEDIUM

(71) Applicant: Panasonic Intellectual Property Corporation of America, Torrance, CA (US)

(72) Inventors: Shunsuke Kuhara, Osaka (JP); Masayoshi Tojima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 789 days.

(21) Appl. No.: 17/134,895

(22) Filed: Dec. 28, 2020

(65) Prior Publication Data
US 2021/0114563 A1    Apr. 22, 2021

Related U.S. Application Data

(63) Continuation of application No. PCT/JP2019/034678, filed on Sep. 4, 2019.
(Continued)

(30) Foreign Application Priority Data

May 29, 2019    (JP) .................. 2019-100675

(51) Int. Cl.
*B60S 5/00*    (2006.01)
*G06Q 10/0631*    (2023.01)
(Continued)

(52) U.S. Cl.
CPC ............... *G06Q 50/40* (2024.01); *B60S 5/00* (2013.01); *G06Q 10/0631* (2013.01);
(Continued)

(58) Field of Classification Search
CPC ....... B60S 5/00; B60S 1/64; G06Q 10/06312; G06Q 10/06315; G06Q 10/20;
(Continued)

(56) References Cited

U.S. PATENT DOCUMENTS

2007/0041865 A1* 2/2007 Ayoub .................... A61L 9/125
                                                                                 700/285
2014/0309806 A1* 10/2014 Ricci ...................... G06F 21/31
                                                                                 701/1
(Continued)

FOREIGN PATENT DOCUMENTS

GB              2558722        *   7/2018
JP           2002-166379           6/2002
(Continued)

OTHER PUBLICATIONS

International Search Report (ISR) issued on Nov. 12, 2019 in International (PCT) Application No. PCT/JP2019/034678.
(Continued)

*Primary Examiner* — Joan T Goodbody
*Assistant Examiner* — Godfrey Aleksander Maciorowski
(74) *Attorney, Agent, or Firm* — Wenderoth, Lind & Ponack, L.L.P.

(57) ABSTRACT

An information processing method includes the following executed by a computer: obtaining a result of sensing the interior of a mobile body; performing a recognition process of recognizing at least one of dirt and damage inside the mobile body, on the basis of the result of sensing; determining handling timing for handling at least one of the dirt and the damage inside the mobile body, according to the result of the recognition process; and outputting a notification for the mobile body to move to a handling place according to the handling timing.

16 Claims, 10 Drawing Sheets

Related U.S. Application Data

(60) Provisional application No. 62/776,774, filed on Dec. 7, 2018.

(51) Int. Cl.
  *G06Q 10/20* (2023.01)
  *G06Q 50/40* (2024.01)
  *G06V 20/59* (2022.01)
  *G05D 1/00* (2006.01)

(52) U.S. Cl.
  CPC . *G06Q 10/06312* (2013.01); *G06Q 10/06315* (2013.01); *G06Q 10/20* (2013.01); *G06V 20/593* (2022.01); *G05D 1/0225* (2013.01)

(58) Field of Classification Search
  CPC .. G06Q 50/30; G06Q 10/0631; G06V 20/593; G06V 20/59; G05D 1/0225
  See application file for complete search history.

(56) References Cited

U.S. PATENT DOCUMENTS

| | | | |
|---|---|---|---|
| 2017/0148102 A1* | 5/2017 | Franke | G06Q 30/0601 |
| 2017/0210352 A1 | 7/2017 | Stauffer et al. | |
| 2017/0278312 A1* | 9/2017 | Minster | G07C 5/006 |
| 2018/0284786 A1* | 10/2018 | Moshkina-Martinson | A47L 9/2831 |
| 2018/0330475 A1* | 11/2018 | Tokatyan | G06T 5/70 |
| 2019/0049978 A1* | 2/2019 | Brede | A47L 9/2826 |
| 2019/0176769 A1 | 6/2019 | Strasdat et al. | |
| 2019/0251759 A1* | 8/2019 | Lora | H04W 4/44 |
| 2019/0266295 A1* | 8/2019 | Masuda | G06Q 50/40 |
| 2019/0378350 A1* | 12/2019 | DeRouen | G07C 5/008 |
| 2020/0029768 A1* | 1/2020 | Mellinger, III | A47L 9/2894 |
| 2021/0197769 A1* | 7/2021 | Shirakura | B60S 1/56 |

FOREIGN PATENT DOCUMENTS

| | | |
|---|---|---|
| JP | 2013-54537 | 3/2013 |
| WO | 2018/033283 | 2/2018 |

OTHER PUBLICATIONS

Extended European Search Report issued Nov. 30, 2021 in corresponding European Patent Application No. 19892051.4.

\* cited by examiner

<SNACK CRUMBS>

<SPILLED BEVERAGE>

<PLASTIC BOTTLE>

FIG. 3

| KINDS OF DIRT OR DAMAGE | HANDLING METHOD | HANDLING TIME | HANDLING FEE |
|---|---|---|---|
| UNTIDY SEAT COVER | SEAT COVER ADJUSTMENT | 3 MINUTES | ¥AAA |
| PLASTIC BOTTLE / WASTEPAPER, ETC. | TRASH REMOVAL | 3 MINUTES | ¥BBB |
| SNACK CRUMBS | VACUUM CLEANER | 10 MINUTES | ¥CCC |
| BEVERAGE | WIPING / STAIN REMOVAL / DRYING | 30 MINUTES | ¥DDD |
| DIRT ON VEHICLE EXTERIOR | CAR WASHING | 30 MINUTES | ¥EEE |
| VOMIT | CLEANING | 10 HOURS | ¥FFF |

FIG. 4

| PERCENTAGE OF DIRT OR DAMAGE RANGE | UNDER 10% | 10% TO 30% | ABOVE 30% |
|---|---|---|---|
| LEVEL OF DIRT OR DAMAGE RANGE | LOW | MIDDLE | HIGH |
| SPECIFIC EXAMPLE | (SPACE INSIDE SEAT MOBILE BODY / DIRT OR DAMAGE) | | |

INFORMATION PROCESSING METHOD, INFORMATION PROCESSING DEVICE, AND NON-TRANSITORY COMPUTER-READABLE RECORDING MEDIUM

CROSS REFERENCE TO RELATED APPLICATIONS

This application is a U.S. continuation application of PCT International Patent Application Number PCT/JP2019/034678 filed on Sep. 4, 2019, claiming the benefit of priority of U.S. Provisional Patent Application No. 62/776,774 filed on Dec. 7, 2018 and Japanese Patent Application Number 2019-100675 filed on May 29, 2019, the entire contents of which are hereby incorporated by reference.

BACKGROUND

1. Technical Field

The present disclosure relates to information processing methods for information related to mobile bodies.

2. Description of the Related Art

Conventionally, techniques for managing operations of mobile bodies are known (Japanese Unexamined Patent Application Publication No. 2013-054537).

Furthermore, techniques related to mobile bodies including robots that automatically clean the interior of the mobile bodies are disclosed (Japanese Unexamined Patent Application Publication No. 2002-166379).

SUMMARY

In the management of the operations of a mobile body, when there is any dirt or damage inside the mobile body, it is preferred that the dirt or the damage be handled at the appropriate timing.

In view of this, an object of the present disclosure is to provide an information processing method, an information processing device, and a non-transitory computer-readable recording medium by which dirt or damage inside a mobile body can be handled at the appropriate timing.

An information processing method according to one aspect of the present disclosure includes the following executed by a computer: obtaining a result of sensing an interior of a mobile body; performing a recognition process of recognizing at least one of dirt or damage inside the mobile body, based on the result of sensing; determining handling timing for handling the at least one of the dirt or the damage inside the mobile body, according to a result of the recognition process; and outputting a notification for the mobile body to move to a handling place according to the handling timing.

An information processing device according to one aspect of the present disclosure includes: an obtainer which obtains a result of sensing an interior of a mobile body; a recognition process executor which performs a recognition process of recognizing at least one of dirt or damage inside the mobile body, based on the result of sensing; and a handling timing determination unit which determines handling timing for handling the at least one of the dirt or the damage inside the mobile body, according to a result of the recognition process, and outputs a notification for the mobile body to move to a handling place according to the handling timing.

A non-transitory computer-readable recording medium according to one aspect of the present disclosure is a non-transitory computer-readable recording medium having recorded thereon a program that causes a computer to execute a first process including the following executed by the computer: obtaining a result of sensing an interior of a mobile body; performing a recognition process of recognizing at least one of dirt or damage inside the mobile body, based on the result of sensing; determining handling timing for handling the at least one of the dirt or the damage inside the mobile body, according to a result of the recognition process; and outputting a notification for the mobile body to move to a handling place according to the handling timing.

With the information processing method, the information processing device, and the non-transitory computer-readable recording medium according to one aspect of the present disclosure, dirt or damage inside a mobile body can be handled at the appropriate timing.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a schematic diagram illustrating one example of a table stored in a recognition process executor according to an embodiment;

FIG. 4 is a schematic diagram illustrating one specific example of percentages of a dirt or damage range in a predetermined area inside a mobile body according to an embodiment;

Figure 1:
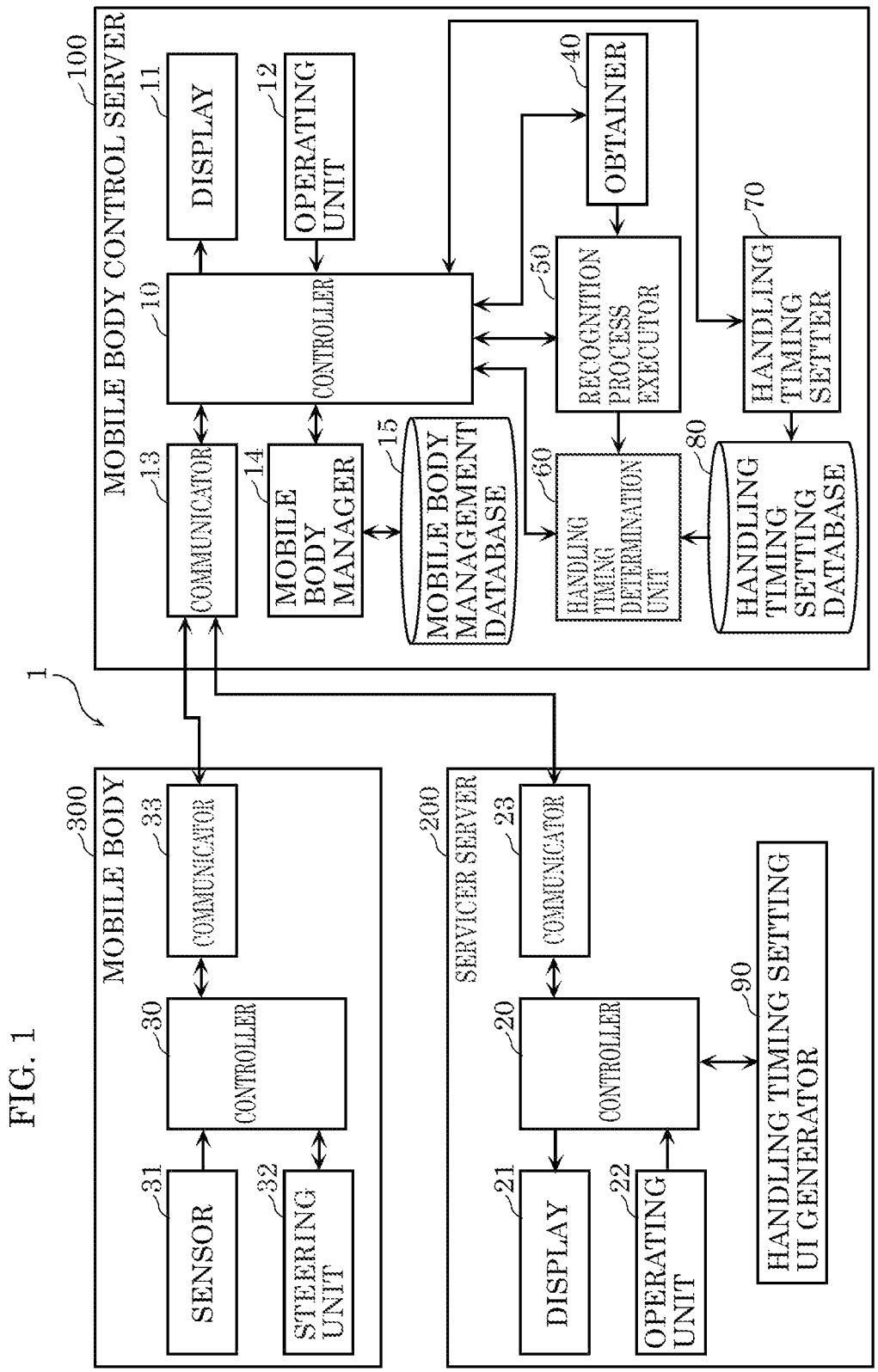
FIG. 1 is a block diagram illustrating the configuration of an information processing system according to an embodiment.

DETAILED DESCRIPTION OF THE EMBODIMENTS (Underlying Knowledge Forming Basis of One Aspect of the Present Disclosure)

Generally, in autonomous mobile bodies, drivers are absent and thus, there is a tendency that less attention is paid to the condition of dirt or damage inside the mobile bodies compared to mobile bodies with drivers. Therefore, in the case where autonomous mobile bodies are provided to users, it is difficult to handle dirt or damage inside the mobile bodies at the appropriate timing. For example, when the operation is such that dirt or damage inside the mobile bodies is often handled, the frequency that users feel discomfort can be reduced, but the utilization rate of the mobile bodies is reduced. Conversely, for example, when the operation is such that dirt or damage inside the mobile bodies are not often handled, it is possible to reduce the decrease in the utilization rate of the mobile bodies, but the frequency that users feel discomfort will increase.

In view of this problem, the inventors repeated diligent examinations and experiments. As a result, the inventors have conceived of an information processing method, an information processing device, and a non-transitory computer-readable recording medium according to one aspect of the present disclosure described below by which dirt or damage inside a mobile body can be handled at the appropriate timing.

An information processing method according to one aspect of the present disclosure includes the following executed by a computer: obtaining a result of sensing an interior of a mobile body; performing a recognition process of recognizing at least one of dirt or damage inside the mobile body, based on the result of sensing; determining handling timing for handling the at least one of the dirt or the damage inside the mobile body, according to a result of the recognition process; and outputting a notification for the mobile body to move to a handling place according to the handling timing.

According to the above information processing method, handling timing for handling at least one of dirt and damage inside the mobile body is determined from the result of sensing the interior of the mobile body, and a notification for the mobile body to move to the handling place according to the determined handling timing is output. Thus, the dirt or the damage inside the mobile body can be handled at the appropriate timing. In other words, the dirt or the damage can be efficiently handled, and thus it is possible to improve the utilization rate of the mobile body.

Furthermore, the handling timing may be a point in time at which the recognition process is performed. With this, when at least one of dirt and damage inside the mobile body is recognized, the dirt or the damage can be handled without delay.

Furthermore, the handling timing may be a certain time later than a point in time at which the recognition process is performed, and the certain time may be determined according to the result of the recognition process to determine the handling timing. Thus, the handling timing can be determined according to the result of recognizing dirt or damage inside the mobile body.

Furthermore, the notification may be output when no passenger or freight is present in the mobile body after the handling timing comes. Thus, during a period in which a mobile body transports passengers or freight, the mobile body can be kept from moving to the handling place.

Furthermore, the handling timing may be determined according to the level of the dirt or the damage inside the mobile body that has been recognized as the result of the recognition process. Thus, the handling timing can be determined according to the level of dirt or damage inside the mobile body.

Furthermore, the handling timing may be determined according to the kind of the dirt or the damage inside the mobile body that has been recognized as the result of the recognition process. Thus, the handling timing can be determined according to the kind of dirt or damage inside the mobile body.

Furthermore, the handling timing may be determined according to a cost for handling the dirt or the damage inside the mobile body that has been recognized as the result of the recognition process. Thus, the handling timing can be determined according to a cost for handling dirt or damage inside the mobile body.

Furthermore, the handling timing may be cleaning timing for cleaning the mobile body, and the cleaning timing may be determined according to whether or not the dirt inside the mobile body that has been recognized as the result of the recognition process is of a kind that deteriorates over time. Thus, the cleaning timing can be determined according to whether the dirt inside the mobile body deteriorates over time.

Furthermore, the result of the recognition process may be displayed, a screen on which a handling timing setting is to be entered may be displayed, the handling timing setting entered may be stored, and the handling timing may be determined using the handling timing setting stored. Thus, the handling timing can be determined on the basis of the handling timing settings provided by a user who uses the information processing method.

Furthermore, the notification may be a travel request made to the mobile body. With this, it is possible to cause the mobile body to move to the handling place according to the handing timing.

Furthermore, the notification may be a recommendation for an owner or a manager of the mobile body on handling of the interior of the mobile body. With this, an owner or a manager of the mobile body can know a recommendation on handling of the interior of the mobile body.

Furthermore, the handling timing may be determined according further to a characteristic of a passenger scheduled to ride toward the dirt or the damage inside the mobile body. Thus, the handling timing can be determined according to passengers scheduled to ride in the mobile body.

Furthermore, information indicating whether or not an apparatus that the mobile body includes to handle the dirt or the damage inside the mobile body has operated may be obtained, and the handling timing may be determined according further to whether or not the apparatus has operated. Thus, the handling timing can be determined according to whether or not the dirt or the damage inside the mobile body has been handled.

An information processing device according to one aspect of the present disclosure includes: an obtainer which obtains a result of sensing an interior of a mobile body; a recognition process executor which performs a recognition process of recognizing at least one of dirt or damage inside the mobile body, based on the result of sensing; and a handling timing determination unit which determines handling timing for handling the at least one of the dirt or the damage inside the mobile body, according to a result of the recognition process, and outputs a notification for the mobile body to move to a handling place according to the handling timing.

According to the above information processing device, handling timing for handling at least one of dirt and damage inside the mobile body is determined from the result of sensing the interior of the mobile body, and a notification for the mobile body to move to the handling place according to the determined handling timing is output. Thus, the dirt or the damage inside the mobile body can be handled at the appropriate timing.

A non-transitory computer-readable recording medium according to one aspect of the present disclosure is a non-transitory computer-readable recording medium having recorded thereon a program that causes a computer to execute a first process including the following executed by the computer: obtaining a result of sensing an interior of a mobile body; performing a recognition process of recognizing at least one of dirt or damage inside the mobile body, based on the result of sensing; determining handling timing for handling the at least one of the dirt or the damage inside the mobile body, according to a result of the recognition process; and outputting a notification for the mobile body to move to a handling place according to the handling timing.

According to the above non-transitory computer-readable recording medium, handling timing for handling at least one of dirt and damage inside the mobile body is determined from the result of sensing the interior of the mobile body, and a notification for the mobile body to move to the handling place according to the determined handling timing is output. Thus, the dirt or the damage inside the mobile body can be handled at the appropriate timing.

Hereinafter, specific examples of the information processing method, the information processing device, and the non-transitory computer-readable recording medium according to one aspect of the present disclosure will be described with reference to the drawings. Each of the embodiments described below shows a specific example of the present disclosure. Thus, the numerical values, shapes, structural elements, and the arrangement and connection of the structural elements, steps, the processing order of the steps etc., shown in the following embodiments are mere examples, and are not intended to limit the present disclosure. Note that the figures are schematic diagrams and are not necessarily precise illustrations.

Note that general and specific aspects of the present disclosure may be implemented using a system, a method, an integrated circuit, a computer program, or a computer-readable recording medium such as a compact disc read-only memory (CD-ROM), or any combination of systems, methods, integrated circuits, computer programs, or recording media.

EMBODIMENT

Hereinafter, an information processing system according to an embodiment will be described. This information processing system manages the operations of a mobile body that transports passengers or freight.

Here, as an example, the mobile body is described as being an autonomous vehicle that is used in ridesharing services, but the mobile body does not necessarily need to be limited to the autonomous vehicle that is used in ridesharing services as long as the mobile body is capable of transporting passengers or freight. Furthermore, there may or may not be a driver or a seat.

[1. Configuration of Information Processing System]

FIG. 1 is a block diagram illustrating the configuration of information processing system 1 according to an embodiment.

As illustrated in FIG. 1, information processing system 1 includes mobile body control server 100, servicer server 200, and one or more mobile bodies 300.

Mobile body 300 is an autonomous vehicle that is used in ridesharing services and transports passengers or freight. Although FIG. 1 could be interpreted as if there is one mobile body 300, the number of mobile bodies 300 is not necessarily limited to one and may be two or more.

Mobile body 300 includes controller 30, sensor 31, steering unit 32, and communicator 33. Furthermore, mobile body 300 may include, for example, an apparatus that handles dirt or damage inside mobile body 300. For example, handling means cleaning or repairing, and the handling apparatus is a dust collector, a self-propelled vacuum cleaner, sterilization equipment, deodorization equipment, repair equipment, or the like.

Sensor 31 performs sensing on the interior of mobile body 300 and outputs sensing information indicating the sensing result. For example, sensor 31 may include an imaging device such as a digital video camera and a digital still camera, capture an image of a seat inside mobile body 300, and output the captured image as the sensing information. Furthermore, for example, sensor 31 may include an odor sensor, sense an odor in the internal space of mobile body 300, and output, as the sensing information, information indicating the sensed odor. Moreover, for example, sensor 31 may include an infrared sensor, measure the surface temperature of a seat inside mobile body 300, and output the measured surface temperature as the sensing information. Furthermore, for example, sensor 31 may include a directional microphone, collect sound inside mobile body 300, and output the collected sound as the sensing information.

Steering unit 32 steers mobile body 300. Steering unit 32 may be, for example, dedicated hardware, or may, for example, include a processor and memory and use the processor to execute a program stored in the memory.

Communicator 33 communicates with other devices having communication capability. The other devices include mobile body control server 100. For example, communicator 33 may include a radio communicator and communicate with other devices by radio.

Controller 30 controls sensor 31, steering unit 32, and communicator 33. Controller 30 may be, for example, dedicated hardware, or may, for example, include a processor and memory and use the processor to execute a program stored in the memory.

Mobile body control server 100 is used by a control company that controls mobile body 300.

Mobile body control server 100 includes controller 10, display 11, operating unit 12, communicator 13, mobile body manager 14, mobile body management database 15, obtainer 40, recognition process executor 50, handling timing determination unit 60, handling timing setter 70, and handling timing setting database 80. Mobile body control server 100 is, for example, a computer including a processor and memory, and may provide various functions by the processor executing a program stored in the memory.

Communicator 13 communicates with other devices having communication capability. The other devices include mobile body 300 and servicer server 200. For example, communicator 13 may include a radio communicator and communicate with other devices by radio.

Display 11 shows an image to a user who is using mobile body control server 100. For example, display 11 may include a display device such as a liquid-crystal display and show an image on the display device.

Operating unit 12 receives input from a user who is using mobile body control server 100. For example, operating unit 12 may include an input device such as a keyboard, a mouse, and a touch panel and receive input made by a user using the input device.

Mobile body management database 15 is a database in which information related to the condition of dirt or damage inside mobile body 300 is stored.

Mobile body manager 14 manages the information stored in mobile body management database 15.

Handling timing setting database 80 is a database in which information related to settings of the timing for handling dirt or damage inside mobile body 300 (hereinafter also referred to as "handling timing settings") is stored. Handling timing setting database 80 may store, as the handling timing settings, information indicating time at which the interior of mobile body 300 is cleaned or information indicating a cycle in which the interior of mobile body 300 is cleaned, for example. For example, the information indicating the cleaning time may indicate that "cleaning is performed on 12:00 and 24:00 everyday", and the information indicating the cleaning cycle may indicate that "cleaning is performed every four hours after the start of the service". Handling timing setting database 80 may store handling timing settings that are different, for example, between the season and the off-season. In this case, handling timing setting database 80 may further store information indicating the season. For example, the information indicating the season may indicate time slots in which events such as soccer or baseball games and concerts are held or locations at which these events are held. Furthermore, handling timing setting database 80 may store handling timing settings that are different from each other according to the weather condition. For example, the weather condition may be a rainy day, a sunny day, an extremely hot day, or an extremely cold day. In this case, handling timing setting database 80 may further store information indicating weather information.

Handling timing setter 70 manages the information stored in handling timing setting database 80.

Obtainer 40 obtains a result of sensing the interior of mobile body 300. More specifically, obtainer 40 obtains, as the result of sensing the interior of mobile body 300, the sensing information output from sensor 31 of mobile body 300. In other words, obtainer 40 obtains the sensing information transmitted from communicator 33 of mobile body 300 and received by communicator 13 of mobile body control server 100.

Recognition process executor 50 performs a recognition process of recognizing at least one of dirt and damage inside mobile body 300 on the basis of the result of sensing the interior of mobile body 300 that has been obtained by obtainer 40.

For example, when the sensing information is an image of the interior of mobile body 300, recognition process executor 50 may perform image processing on the image and detect dirt or damage inside mobile body 300. In this case, for example, recognition process executor 50 may detect a difference between an image captured before the entry of a passenger and an image captured after the exit of the passenger, and perform an image recognition process on the detected difference to detect dirt or damage inside mobile body 300. Furthermore, in this case, for example, recognition process executor 50 may perform the image recognition process on the image to identify movement of the passenger on board, and determine the kind of dirt or damage inside mobile body 300 on the basis of the identified movement. For example, when recognition process executor 50 identifies the passenger as having been eating snacks, recognition process executor 50 may determine that the dirt or the damage inside mobile body 300 is snack crumbs. Furthermore, for example, when recognition process executor 50 identifies the passenger as having been drinking a beverage, recognition process executor 50 may determine that the dirt or the damage inside mobile body 300 is a spilled beverage. Furthermore, for example, when recognition process executor 50 identifies the passenger as having been blowing his or her nose, recognition process executor 50 may determine that the dirt or the damage inside mobile body 300 is a facial tissue.

Figure 2A:
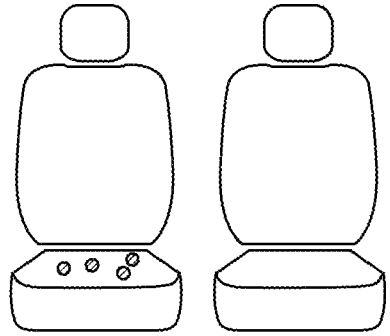
FIG. 2A is a schematic diagram illustrating one example of the interior of a mobile body according to an embodiment.
Figure 2B:
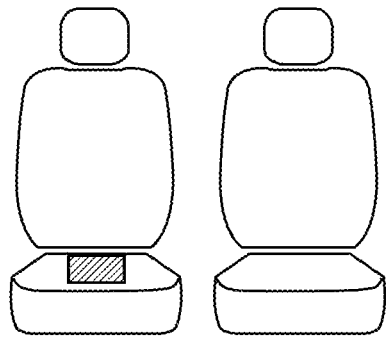
FIG. 2B is a schematic diagram illustrating one example of the interior of a mobile body according to an embodiment.
Figure 2C:
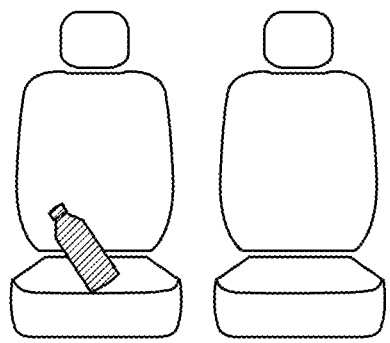
FIG. 2C is a schematic diagram illustrating one example of the interior of a mobile body according to an embodiment.

FIG. 2A is a schematic diagram illustrating one example of the interior of mobile body 300 when the kind of dirt or damage inside mobile body 300 is "snack crumbs", FIG. 2B is a schematic diagram illustrating one example of the interior of mobile body 300 when the kind of dirt or damage inside mobile body 300 is "a spilled beverage", and FIG. 2C is a schematic diagram illustrating one example of the interior of mobile body 300 when the kind of dirt or damage inside mobile body 300 is "a plastic bottle".

For example, when the sensing information is information indicating an odor in the internal space of mobile body 300, recognition process executor 50 may detect dirty air inside mobile body 300 on the basis of the information indicating the odor.

For example, when the sensing information is the inner surface temperature of mobile body 300, recognition process executor 50 may detect a wet area inside mobile body 300 on the basis of the inner surface temperature of mobile body 300. For example, a wet area on a seat may be detected.

In the recognition process, recognition process executor 50 may calculate the level of dirt or damage inside mobile body 300, for example.

For example, recognition process executor 50 may identify the number of spots of dirt or damage inside mobile body 300 and calculate the level of the dirt or the damage on the basis of the identified number of spots of dirt or damage. In this case, for example, when the number of spots of dirt or damage is relatively small, recognition process executor 50 may determine the level of the dirt or the damage as "low", when the number of spots of dirt or damage is relatively in the middle range, recognition process executor 50 may determine the level of the dirt or the damage as "middle", and when the number of spots of dirt or damage is relatively large, recognition process executor 50 may determine the level of the dirt or the damage as "high". For example, when the number of spots of dirt or damage is less than or equal to three, recognition process executor 50 may determine the level of the dirt or the damage as "low", when the number of spots of dirt or damage is between four and six, inclusive, recognition process executor 50 may determine the level of the dirt or the damage as "middle", and when the number of spots of dirt or damage is greater than or equal to seven, recognition process executor 50 may determine the level of the dirt or the damage as "high". Here, the number of spots of dirt or damage may be the number of spots of dirt or damage throughout the interior of mobile body 300, may be the number of spots of dirt or damage at a specific location inside mobile body 300, or may be the number of spots of dirt or damage per unit area (in other words, density).

For example, recognition process executor 50 may specify a lapse of time since the interior of mobile body 300 becomes dirty or damaged and calculate the level of the dirt or the damage on the basis of the specified lapse of time. For example, when the dirt or the damage inside mobile body 300 is a spilled beverage, the cleaning time or fee for the spilled beverage increases as time elapses after the beverage is spilled. Therefore, recognition process executor 50 may calculate the level of dirt or damage such that the level of dirt or damage increases with the lapse of time since the interior of mobile body 300 becomes dirty or damaged, for example. For example, when the lapse of time since the interior of mobile body 300 becomes dirty or damaged is less than one hour, recognition process executor 50 may determine the level of the dirt or the damage as "low", when the lapse of time since the interior of mobile body 300 becomes dirty or damaged is at least one hour, but less than three hours, recognition process executor 50 may determine the level of the dirt or the damage as "middle", and when the lapse of time since the interior of mobile body 300 becomes dirty or damaged is at least three hours, recognition process executor 50 may determine the level of the dirt or the damage as "high".

For example, recognition process executor 50 may identify the kind of dirt or damage inside mobile body 300 and calculate the level of the dirt or the damage on the basis of the number of identified kinds of dirt or damage. In this case, for example, when the number of kinds of dirt or damage is one, recognition process executor 50 may determine the level of the dirt or the damage as "low", when the number of kinds of dirt or damage is two, recognition process executor 50 may determine the level of the dirt or the damage as "middle", and when the number of kinds of dirt or damage is three or more, recognition process executor 50 may determine the level of the dirt or the damage as "high".

For example, recognition process executor 50 may identify the kind of dirt or damage inside mobile body 300, specify a handling method corresponding the identified kind of the dirt or the damage, and calculate the level of the dirt or the damage on the basis of the specified handling method.

In this case, for example, when the number of handling methods is one, recognition process executor 50 may determine the level of the dirt or the damage as "low", when the number of handling methods is two, recognition process executor 50 may determine the level of the dirt or the damage as "middle", and when the number of handling methods is three or more, recognition process executor 50 may determine the level of the dirt or the damage as "high". In this case, for example, recognition process executor 50 may store a table in which the kind of dirt or damage and the handling method are associated with each other, refer to the stored table, and specify the handling method corresponding to the identified kind of the dirt or the damage.

FIG. 3 is a schematic diagram illustrating one example of the table stored in recognition processing executor 50.

For example, recognition process executor 50 may identify the kind of dirt or damage inside mobile body 300, specify a handling cost for handling the dirt or the damage according to the identified kind of the dirt or the damage, and calculate the level of the dirt or the damage on the basis of the specified handling cost. The handling cost is, for example, handling time or a handling fee. In this case, for example, in the case where the handling cost is handling time, when the handling time is less than ten minutes, recognition process executor 50 may determine the level of the dirt or the damage as "low", when the handling time is at least ten minutes, but less than one hour, recognition process executor 50 may determine the level of the dirt or the damage as "middle", and when the handling time is at least one hour, recognition process executor 50 may determine the level of the dirt or the damage as "high". Furthermore, in this case, for example, recognition process executor 50 may store a table in which the kind of dirt or damage and the handling time or handling fee method are associated with each other, refer to the stored table, and specify the handling method according to the identified kind of the dirt or the damage. One example of the table to be stored may be the table illustrated in FIG. 3. The handling time and the handling fee may be preset values, may be values calculated from previous records, or may be values obtained from an external business partner, etc.

For example, recognition process executor 50 may identify the percentage of a dirt or damage range in a predetermined area inside mobile body 300 and calculate the level of the dirt or the damage on the basis of the identified percentage of the dirt or the damage. In this case, for example, when the percentage of the dirt or damage range is less than 10%, recognition process executor 50 may determine the level of the dirt or the damage as "low", when the percentage of the dirt or damage range is at least 10%, but less than 30%, recognition process executor 50 may determine the level of the dirt or the damage as "middle", and the percentage of the dirt or damage range is at least 30%, recognition process executor 50 may determine the level of the dirt or the damage as "high".

FIG. 4 is a schematic diagram illustrating one specific example of the percentages of the dirt or damage range in the predetermined area inside mobile body 300.

Here, dirt or damage may be concentrated on one location or dispersed across multiple locations inside mobile body 300. Therefore, recognition process executor 50 may determine a usable range in the predetermined area inside mobile body 300 from the position of the dirt or the damage and calculate the level of the dirt according to the percentage of the determined usable range, for example. As an example of the usable range in the predetermined area inside mobile body 300, a region located within a predetermined range from the position of each dirt or damage may be set as a non-usable range while the region other than the non-usable range in the predetermined area may be set as a usable range.

Recognition process executor 50 may calculate the level of dirt or damage by combining the aforementioned calculations of the level of dirt or damage.

For example, recognition process executor 50 may calculate the level of dirt or damage at each location inside mobile body 300.

For example, recognition process executor 50 may calculate the level of dirt or damage in the entire area inside mobile body 300 depending on the level of dirt or damage at each location inside mobile body 300. Recognition process executor 50 may change the level of dirt or damage at each location inside mobile body 300 into numerical form and determine the total of these numerical values as the level of dirt or damage in the entire area inside mobile body 300, for example. Furthermore, recognition process executor 50 may determine the highest value of the level of dirt or damage at each location inside mobile body 300 as the level of dirt or damage in the entire area inside mobile body 300, for example. Moreover, recognition process executor 50 may change the level of dirt or damage at each location inside mobile body 300 into numerical form and determine the highest value of the totals of the numerical values of respective parts inside mobile body 300 as the level of dirt or damage in the entire area inside mobile body 300, for example. Examples of these parts include a seat, the floor, and a window. Furthermore, recognition process executor 50 may change the level of dirt or damage at each location inside mobile body 300 into numerical form and determine the average of these numerical values as the level of dirt or damage in the entire area inside mobile body 300, for example.

Recognition process executor 50 may further detect dirt or damage on the exterior of mobile body 300 on the basis of information obtained by a device provided outside mobile body 300, for example. For example, the information is an image captured by a surveillance camera installed in a garage where mobile body 300 is stored or an image captured by an onboard camera on a mobile body different from mobile body 300.

According to the result of the recognition process performed by recognition process executor 50, handling timing determination unit 60 determines a handling timing for handling at least one of dirt and damage inside mobile body 300. Here, furthermore, handling timing determination unit 60 may determine the handling timing using the handling timing settings stored in handling timing setting database 80.

Handling timing determination unit 60 may determine the handling timing according to the level of dirt or damage inside mobile body 300 that has been recognized as a result of the recognition process performed by recognition process executor 50, for example. For example, handling timing determination unit 60 may determine the handling timing to be earlier as the level of dirt or damage inside mobile body 300 increases. For example, when the level of dirt or damage inside mobile body 300 exceeds a threshold value, handling timing determination unit 60 may determine the handling timing to be earlier than preset handling timing, and when the level of dirt of damage inside mobile body 300 does not exceed the threshold value, handling timing determination unit 60 may determine the handling timing so that the handling timing becomes the preset handling timing. The preset handling timing is timing which is indicated in the handling timing settings stored in handling timing setting database 80 and at which dirt or damage inside mobile body 300 is to be handled. Thus, it is possible to keep the availability rate of mobile body 300 from being unnecessarily reduced as a result of handling dirt or damage even when the level thereof is low. In this case, when dirt or damage inside mobile body 300 is dirt or damage of the kind that requires longer cleaning time or a higher cleaning fee as time passes, the threshold value may be set small. For example, dirt of said kind is a spilled beverage or the like, and damage of said kind is fraying of the fabric of a seat or the like. Thus, the time or fee required to handle dirt or damage can be kept from increasing. Furthermore, in this case, handling timing determination unit 60 may further change the threshold value according to the position of dirt or damage inside mobile body 300. For example, the position is a seat or the floor; a beverage liquid less easily infiltrates into the seat than into the floor. Therefore, for example, in the case where the kind of dirt or damage is a spilled beverage, when the dirt or the damage is located at a portion made of a material impermeable to a liquid such as a beverage, the level of urgency for handling can be set lower than when the dirt or the damage is located at a portion made of a material permeable to a liquid such as a beverage. Furthermore, in the case where the level of dirt or damage at each location inside mobile body 300 is calculated as a result of the recognition process of recognition process executor 50, when the level in at least one location exceeds a threshold value, handling timing determination unit 60 may determine the handling timing to be earlier than the preset handling timing. Furthermore, when the number of locations where the level exceeds the threshold value is greater than or equal to a predetermined number, handling timing determination unit 60 may determine the handling timing to be earlier than the preset handling timing. This is because the number of times dirt or damage is handled can be reduced by taking advantage of the fact that in the case where there is dirt or damage only in a partial area inside mobile body 300, service can be provided without giving severe discomfort to passengers. As a more specific example, when the location where the level exceeds the threshold value is a seat and the number of seats where the level exceeds the threshold value is two or more, handling timing determination unit 60 may determine the handling timing to be earlier than the preset handling timing. Furthermore, for example, handling timing determination unit 60 may determine a usable seat for a passenger on the basis of the position of the seat where the level of dirt or damage exceeds the threshold value, and when there is no usable seat, may determine the handing timing to be earlier than the preset handling timing. Moreover, handing timing determination unit 60 may change the threshold value according to the time slot of the current point in time. In this case, for example, handling timing determination unit 60 may set the threshold value for the off-season to a relatively small value and set the threshold value for the season to a relatively large value. This makes it possible to reduce discomfort that would be felt by passengers as a result of provision of mobile body 300 including dirt or damage even in the off-season and keep the availability rate of mobile body 300 from decreasing even in the season. Furthermore, even when the degree of dirt or damage inside mobile body 300 exceeds the threshold value, during service provision, handling timing determination unit 60 may determine the handing timing to be after completion of the service. This makes it possible to prevent dirt or damage from being handled in the middle of the service. Furthermore, handing timing determination unit 60 may determine handling details for dirt or damage according to the time slot. In this case, handing timing determination unit 60 may determine handing details, for example, by limiting handing details in the off-season to handling details that require relatively short time and not limiting handing details in the season. Examples of the handing details that requires relatively short time include trash removal and a vacuum cleaner. Moreover, handing timing determination unit 60 may change the threshold value according to the demands for mobile body 300. In this case, for example, handling timing determination unit 60 may set the threshold value to a relatively small value when there is a high demand and set the threshold value to a relatively large value when there is a low demand. Examples of a situation in which there is a high demand include a rainy day, an extremely hot day, an extremely cold day, and a time slot in which an event (such as a concert, soccer, and baseball) is held. Moreover, for example, handling timing determination unit 60 may determine the handling timing to further reduce time left until the next handling timing indicated by the preset handling timing as the level of dirt or damage inside mobile body 300 increases. This makes it possible to set earlier handling timing as the level of dirt or damage increases and conversely set later handling timing as the level of dirt or damage decreases. As a more specific example, when the level of dirt or damage is "low", handling timing determination unit 60 may reduce the time left until the next handing timing by 15 minutes, when the level of dirt or damage is "middle", handling timing determination unit 60 may reduce the time left until the next handing timing by 30 minutes, and the level of dirt or damage is "high", handling timing determination unit 60 may reduce the time left until the next handing timing by one hour. In this case, for example, in the case where the time left until the next handing timing is two hours, when the level of dirt or damage is recognized as "middle" as a result of the recognition process performed by recognition process executor 50, handling timing determination unit 60 determines the handling timing to be an hour and a half later.

Handling timing determination unit 60 may determine the handling timing according to the kind of dirt or damage inside mobile body 300 that has been recognized as a result of the recognition process performed by recognition process executor 50, for example. For example, when there are two or more kinds of dirt or damage inside mobile body 300, handing timing determination unit 60 may determine the handling timing so as to enable handling in a handling place in which the two or more kinds of dirt or damage can be handled. This makes it possible to prevent a situation in which the entire handling of mobile body 300 is not completed in one handling place and mobile body 300 needs to move to another handling place. Furthermore, when the handling timing is cleaning timing for cleaning mobile body 300, handling timing determination unit 60 may determine the cleaning timing according to whether or not the kind of dirt inside mobile body 300 that has been recognized as a result of the recognition process performed by recognition process executor 50 is the kind of dirt that deteriorates over time. For example, the dirt that deteriorates over time is a spilled beverage, and damage that deteriorates over time is fraying of the fabric of a seat or the like.

Handling timing determination unit 60 may determine the handling timing according to a handling cost for handling dirt or damage inside mobile body 300 that has been recognized as a result of the recognition process performed by recognition process executor 50, for example. Thus, for example, in the case where the handling cost is handling time, a period in which the service is temporarily suspended for handling is known, and therefore the handling timing can be determined according to the operation status of the entire service including other mobile bodies 300. In the case where the handling cost is handling time, handling timing determination unit 60 may determine the handling timing so that the handling timing becomes earlier as the handling time increases, for example, when the current point in time is in the off-season. Furthermore, handling timing determination unit 60 may determine the handling timing so that the handling timing becomes earlier as the handling time decreases, for example, when the current point in time is in the season.

Handling timing determination unit 60 may determine the handling timing according to whether or not dirt or damage inside mobile body 300 that has been recognized as a result of the recognition process performed by recognition process executor 50 is specific dirt or damage, for example.

Handling timing determination unit 60 may determine the handling timing to be earlier than predetermined handling timing, for example, when the dirt or the damage is specific dirt or damage. Thus, in the case of dirt or damage that is likely to give discomfort to passengers, it is possible to prioritize handling of the dirt or the damage without picking up new passengers. Particularly, in the case where the specific dirt or damage is vomit, handling timing determination unit 60 may determine the handling timing as a point in time at which the recognition process is performed, for example. It is possible to identify the dirt or the damage as vomit, for example, using an image of the interior of mobile body 300 or/and an odor in the internal space of mobile body 300.

In the case where the handling timing is cleaning timing for cleaning mobile body 300, handing timing determination unit 60 may determine the cleaning timing so that cleaning is done at least once in a preset cleaning period, cleaning is done at least once before the number of rides for passengers reaches a preset number of times, cleaning is done at least once before the total service time for passenger rides reaches preset time, cleaning is done at least once before the number of times of charging or refueling reaches a preset number of times, cleaning is done at least once before the travel distance reaches a preset distance, or cleaning is done at least once before the travel time reaches preset time, for example. This makes it possible to handle dirt or damage that is difficult to detect with a sensor. For example, the dirt that is difficult to detect with a sensor is invisible dust, and the damage that is difficult to detect with a sensor is a tear in the back of a seat that is located out of the sensing range.

Handing timing determination unit 60 may determine, as the handing timing, timing at which the service of mobile body 300 is temporarily suspended due to charging, for example. Thus, it is possible to keep the availability rate of mobile body 300 from decreasing. In this case, handling timing determination unit 60 may search for a place in which both charging and handling of the dirt or the damage are possible. Furthermore, in this case, handing timing determination unit 60 may output a signal for sending, to a charging station, handling staff who handles the dirt or the damage. Alternatively, in this case, handing timing determination unit 60 may output a signal for giving handling staff who handles the dirt or the damage a ride to a charging station during travel to the charging station. Here, other conceivable examples of the case where the service of mobile body 300 is temporarily suspended include a case where maintenance is provided for mobile body 300.

In the case where there are two or more mobile bodies 300, handling timing determination unit 60 may determine the handing timing for one mobile body 300 according to comparison between the level of dirt or damage in said mobile body 300 and the level of dirt or damage in another mobile body 300. This makes it possible to reduce the likelihood that there may be a shortage of mobile bodies 300 providing the service as a result of handling dirt or damage in the plurality of mobile bodies 300 all at once. In this case, handling timing determination unit 60 may determine the handling timing of each mobile body 300 from the perspective of enabling efficient use of the plurality of mobile bodies 300. As a more specific example, handling timing determination unit 60 may determine the handling timing of each mobile body 300 so that earlier handing timing is set, for example, for mobile body 300 having dirt or damage at a higher level. As another more specific example, handing timing determination unit 60 may determine the handling timing of each mobile body 300 to prioritize mobile body 300 having, for example, the shortest time left before temporary suspension of the service. For example, mobile body 300 having the shortest time left before temporary suspension of the service is mobile body 300 that is likely to require charging. As another more specific example, handing timing determination unit 60 may determine the handing timing of each mobile body 300 to prioritize, for example, mobile body 300 around which another available mobile body 300 is located. Furthermore, as another more specific example, handling timing determination unit 60 may determine the handling timing of each mobile body 300 to prioritize, for example, mobile body 300 located in an area where there is a low demand according to the previous records. Moreover, as another more specific example, handing timing determination unit 60 may determine the handing timing of each mobile body 300 to give a higher priority to, for example, mobile body 300 in which handing time for handing dirt or damage is shorter. Handling timing determination unit 60 is not required to set earlier handing timing for one mobile body 300 unless the level of dirt or damage in said mobile body 300 is absolutely high even when the level of dirt or damage in said mobile body 300 is relatively higher than the level of dirt or damage in another mobile body 300. Thus, it is possible to keep the number of times that one mobile body 300 is handled from unnecessarily increasing. Handing timing determination unit 60 may also determine the handling timing according to characteristics of a passenger scheduled to ride toward dirt or damage inside mobile body 300, for example.

Handling timing determination unit 60 may also determine the handing timing, for example, according to whether or not an apparatus that mobile body 300 includes to handle dirt or damage inside mobile body 300 has operated.

When determining the handling timing, handling timing determination unit 60 outputs a notification for moving mobile body 300 to a handling place according to the determined handling timing. For example, handling timing determination unit 60 may output, as the notification, a travel request made to mobile body 300. As another example, handling timing determination unit 60 may output, as the notification, a recommendation on handling of the interior of mobile body 300 for an owner or a manager of mobile body 300. Furthermore, handling timing determination unit 60 may output the notification when there is no passenger or freight in mobile body 300 after the handling timing comes.

For example, when mobile body 300 including sterilization equipment or deodorization equipment completes its service, handling timing determination unit 60 may output, to mobile body 300, an instruction to operate the sterilization equipment or the deodorization equipment to disinfect or deodorize the inside of mobile body 300.

Controller 10 controls display 11, operating unit 12, communicator 13, mobile body manager 14, obtainer 40, recognition process executor 50, handling timing determination unit 60, and handling timing setter 70.

Servicer server 200 is a server used by a service company that provides mobile body 300.

Servicer server 200 includes controller 20, display 21, operating unit 22, communicator 23, and handling timing setting UI generator 90. Servicer server 200 is, for example, a computer including a processor and memory, and may provide various functions by the processor executing a program stored in the memory.

Communicator 23 communicates with other devices having communication capability. The other devices include mobile body control server 100. For example, communicator 23 may include a radio communicator and communicate with other devices by radio.

Display 21 shows an image to a user who is using servicer server 200. When handling timing setting UI generator 90 generates a handling timing setting user interface to be described later, display 21 displays the handling timing setting user interface. For example, display 21 may include a display device such as a liquid-crystal display and show an image on the display device.

Operating unit 22 receives input from a user who is using servicer server 200. For example, operating unit 22 may include an input device such as a keyboard, a mouse, and a touch panel and receive input made by a user using the input device.

Handling timing setting UI generator 90 generates a handling timing setting user interface for displaying information that becomes useful when a user who uses servicer server 200 enters handling timing settings or when a user who uses servicer server 200 enters a travel request for movement of mobile body 300 to a handling place where dirt or damage inside mobile body 300 is to be handled.

The handling timing setting user interface may display the result of the recognition process performed by recognition process executor 50 and display a screen on which a user who uses servicer server 200 enters the handling timing settings or the travel request, for example. In the case where the sensing information is an image of the interior of mobile body 300, for example, the handling timing setting user interface may display an image from which dirt or damage inside mobile body 300 can be visually checked. This allows a user who uses service server 200 to check dirt or damage inside mobile body 300 and enter the handling timing settings or the travel request. Furthermore, in this case, the handling timing setting user interface may display not only the latest image, but also one or more images captured in the past. The handling timing setting user interface may display the position of a handling place where dirt or damage inside mobile body 300 can be handled or estimated time of travel to the handling place, for example. The handling timing setting user interface may also display information about the season and the off-season and the current time, for example. The handling timing setting user interface may also display previous cleaning records, for example.

In the case where there are two or more mobile bodies 300, the handling timing setting user interface may display, in addition to the sensing information of one mobile body 300 subject to the handling timing settings or the travel request, the sensing information of another mobile body 300, for example. This allows a user who uses service server 200 to enter the handing timing settings or the travel request for one mobile body 300 from the perspective of enabling efficient use of two or more mobile bodies 300. Furthermore, in the case where there are two or more mobile bodies 300, the handling timing setting user interface may additionally display the status of each mobile body 300, for example. Examples of the status include being in service, being on standby, being cleaned, and being on charge. This allows a user who uses service server 200 to enter the handing timing settings or the travel request for one mobile body 300 from the perspective of enabling efficient use of two or more mobile bodies 300.

[2. Operations of Information Processing System]

Operations performed by information processing system 1 having the above-described configuration will be described below.

Information processing system 1 performs a first mobile body control process, a handling timing setting input process, and a second mobile body control process as one example.

First, the first mobile body control process will be described with reference to the drawings.

The first mobile body control process is a process performed by mobile body control server 100 to control mobile body 300 according to the result of sensing the interior of mobile body 300.

Figure 5:
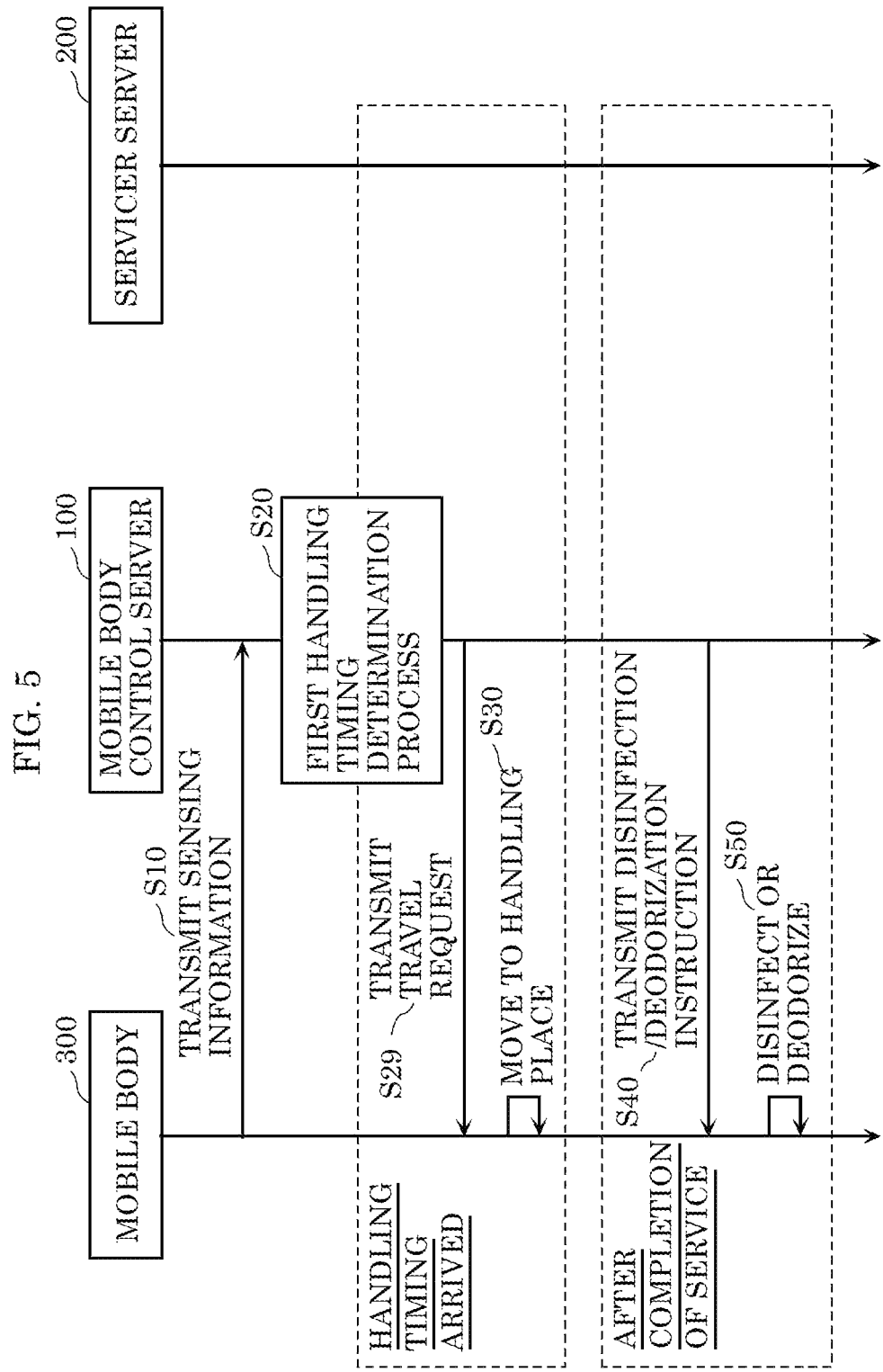
FIG. 5 is a sequence chart of a first mobile body control process according to an embodiment.

FIG. 5 is a sequence chart of the first mobile body control process. In mobile body 300, sensor 31 senses the interior of mobile body 300 and outputs sensing information indicating the sensing result. Furthermore, communicator 33 transmits, to mobile body control server 100, the sensing information output from sensor 31 (Step S10).

When the sensing information is transmitted, communicator 13 in mobile body control server 100 receives the sensing information. When the sensing information is received, mobile body control server 100 starts the first handling timing determination process (Step S20).

Figure 6:
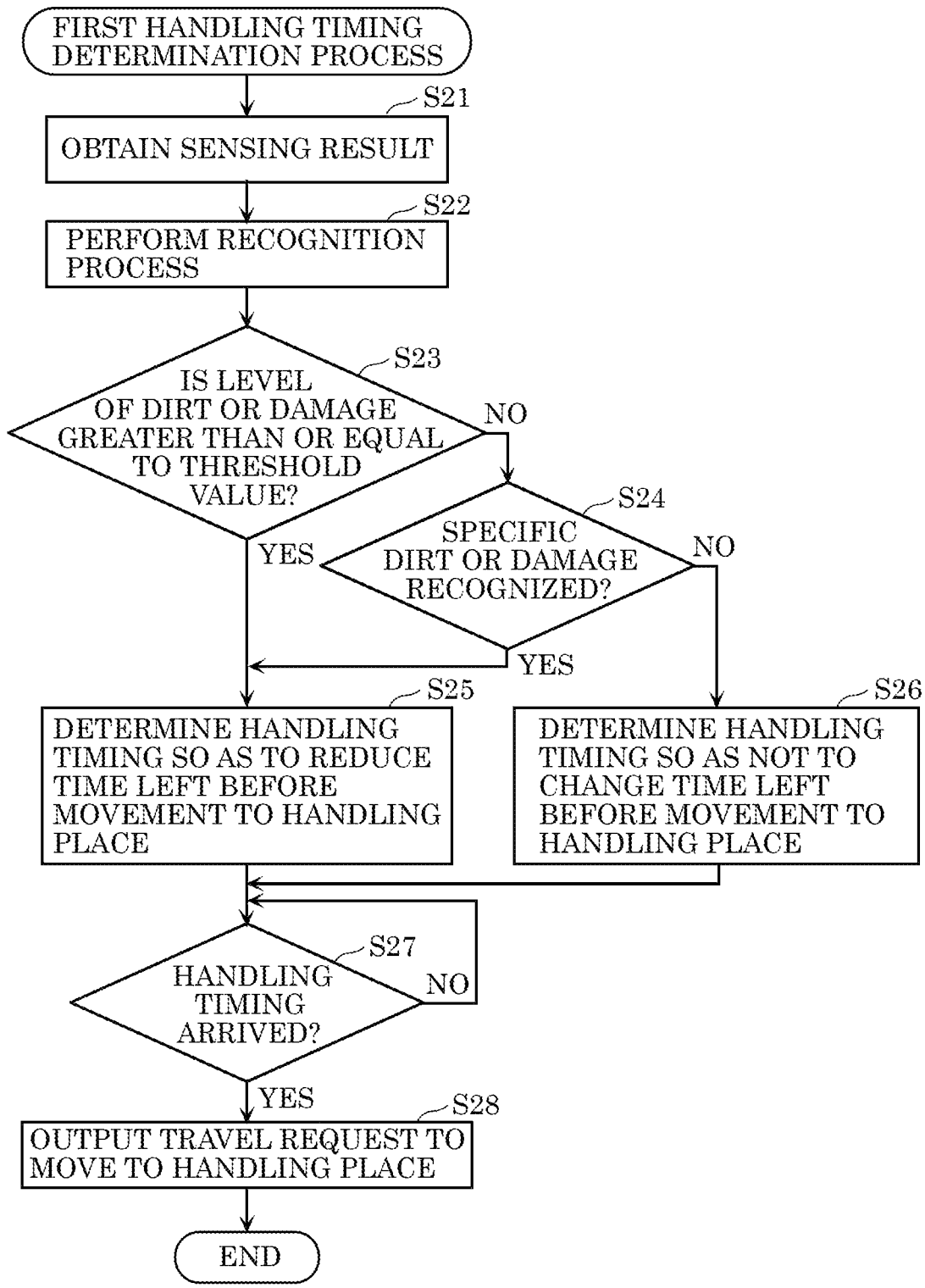
FIG. 6 is a flowchart of a first handling timing determination process according to an embodiment.

FIG. 6 is a flowchart of the first handling timing determination process.

When the first handling timing determination process starts, obtainer 40 obtains, as the result of sensing the interior of mobile body 300, the sensing information received by communicator 13 (Step S21).

When the sensing result is obtained, recognition process executor 50 performs a recognition process of recognizing at least one of dirt and damage inside mobile body 300 on the basis of the obtained sensing result (Step S22).

When the recognition process is performed, handling timing determination unit 60 checks whether or not the level of dirt or damage inside mobile body 300 indicated in the result of the performed recognition process is greater than or equal to a threshold value (Step S23).

When the level of dirt or damage inside mobile body 300 is not greater than or equal to the threshold value in the process in Step S23 (NO in Step S23), handling timing determination unit 60 checks whether or not the dirt or the damage inside mobile body 300 is specific dirt or damage (Step S24). For example, the specific dirt is vomit or the like, and the specific damage is a hole in a seat or the like.

When the level of dirt or damage inside mobile body 300 is greater than or equal to the threshold value in the process in Step S23 (YES in Step S23) and when the dirt or the damage inside mobile body 300 is the specific dirt or damage in the process in Step S24 (YES in Step S24), handling timing determination unit 60 determines the handling timing so as to reduce time left before movement to a handling place (Step S25). The handling place is where the dirt or the damage inside mobile body 300 can be handled at the timing indicated in the handing timing settings stored in handling timing setting database 80.

When the dirt or the damage inside mobile body 300 is not the specific dirt or damage in the process in Step S24 (NO in Step S24), handling timing determination unit 60 determines the handling timing so as not to change the time left before movement to the aforementioned handling place (Step S26).

When the process in Step S25 is completed and when the process in Step S26 is completed, handing timing determination unit 60 waits until the determined handing timing comes (NO in Step S27 is repeated). When the determined handing timing comes (YES in Step S27), handing timing determination unit 60 outputs a travel request for movement of mobile body 300 to a handing place (Step S28).

When the process in Step S28 is completed, mobile body control server 100 ends the first handling timing determination process.

Returning to FIG. 5, the following continues to describe the first mobile body control process.

In mobile body control server 100, when the first handling timing determination process (Step S20) is completed, communicator 13 transmits, to mobile body 300, the travel request for movement of mobile body 300 to the handing place that has been output from handling timing determination unit 60 (Step S29).

When the travel request is transmitted, communicator 33 in mobile body 300 receives the travel request. Subsequently, in response to the travel request, steering unit 32 causes mobile body 300 to move to the handing place (Step S30).

When mobile body 300 including sterilization equipment or deodorization equipment completes its service, handling timing determination unit 60 in mobile body control server 100 outputs, to mobile body 300, an instruction to operate the sterilization equipment or the deodorization equipment to disinfect or deodorize the inside of mobile body 300 (hereinafter also referred to as "disinfection/deodorization instruction"). In this case, communicator 13 transmits the disinfection/deodorization instruction to mobile body 300.

When the disinfection/deodorization instruction is transmitted, communicator 33 in mobile body 300 receives the disinfection/deodorization instruction. Subsequently, the sterilization equipment or the deodorization equipment included in mobile body 300 disinfects or deodorizes the inside of mobile body 300 (Step S50).

Next, the handing timing setting input process will be described with reference to the drawings.

The handling timing setting input process is a process performed by mobile body control server 100 to update the handling timing settings.

Figure 7:
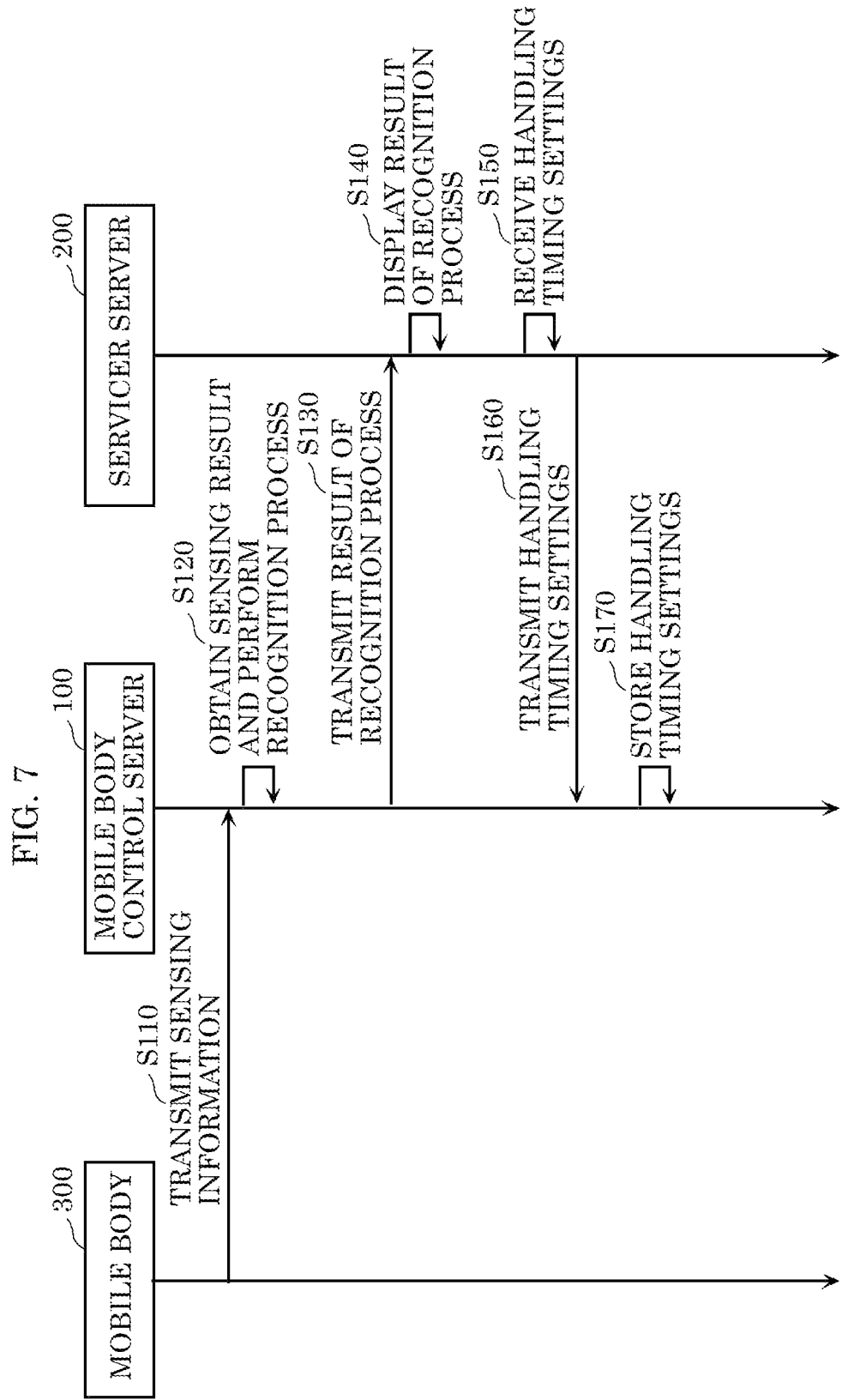
FIG. 7 is a sequence chart of a handling timing setting input process according to an embodiment.

FIG. 7 is a sequence chart of the handling timing setting input process.

In mobile body 300, sensor 31 senses the interior of mobile body 300 and outputs sensing information indicating the sensing result. Furthermore, communicator 33 transmits, to mobile body control server 100, the sensing information output from sensor 31 (Step S110).

When the sensing information is transmitted, communicator 13 in mobile body control server 100 receives the sensing information. When the sensing information is received, obtainer 40 obtains, as the result of sensing the interior of mobile body 300, the sensing information received by communicator 13. When the sensing result is obtained, recognition process executor 50 performs a recognition process of recognizing at least one of dirt and damage inside mobile body 300 on the basis of the obtained sensing result (Step S120).

When the recognition process is performed, communicator 33 transmits the result of the recognition process to servicer server 200 (Step S130).

When the result of the recognition process is transmitted, communicator 23 in servicer server 200 receives the result of the recognition process. When the result of the recognition process is received, handling timing setting UI generator 90 generates a handling timing setting user interface for displaying the result of the recognition process. Subsequently, display 21 displays the generated handling timing setting user interface, that is, the result of the recognition process (Step S140).

When a user who has checked the displayed result of the recognition process enters handling timing settings on operating unit 22, operating unit 22 receives the handling timing settings (Step S150).

When the handling timing settings are received, communicator 23 transmits the received handling timing settings to mobile body control server 100 (Step S160).

When the handling timing settings are transmitted, communicator 13 in mobile body control server 100 receives the handling timing settings. Subsequently, handling timing setter 70 updates the handling timing settings by storing the received handling timing settings into handling timing setting database 80 (Step S170).

Next, the second mobile body control process will be described with reference to the drawings.

The second mobile body control process is a process performed by mobile body control server 100 to control mobile body 300 according to the travel request for mobile body 300 that has been made by a user.

Figure 8:
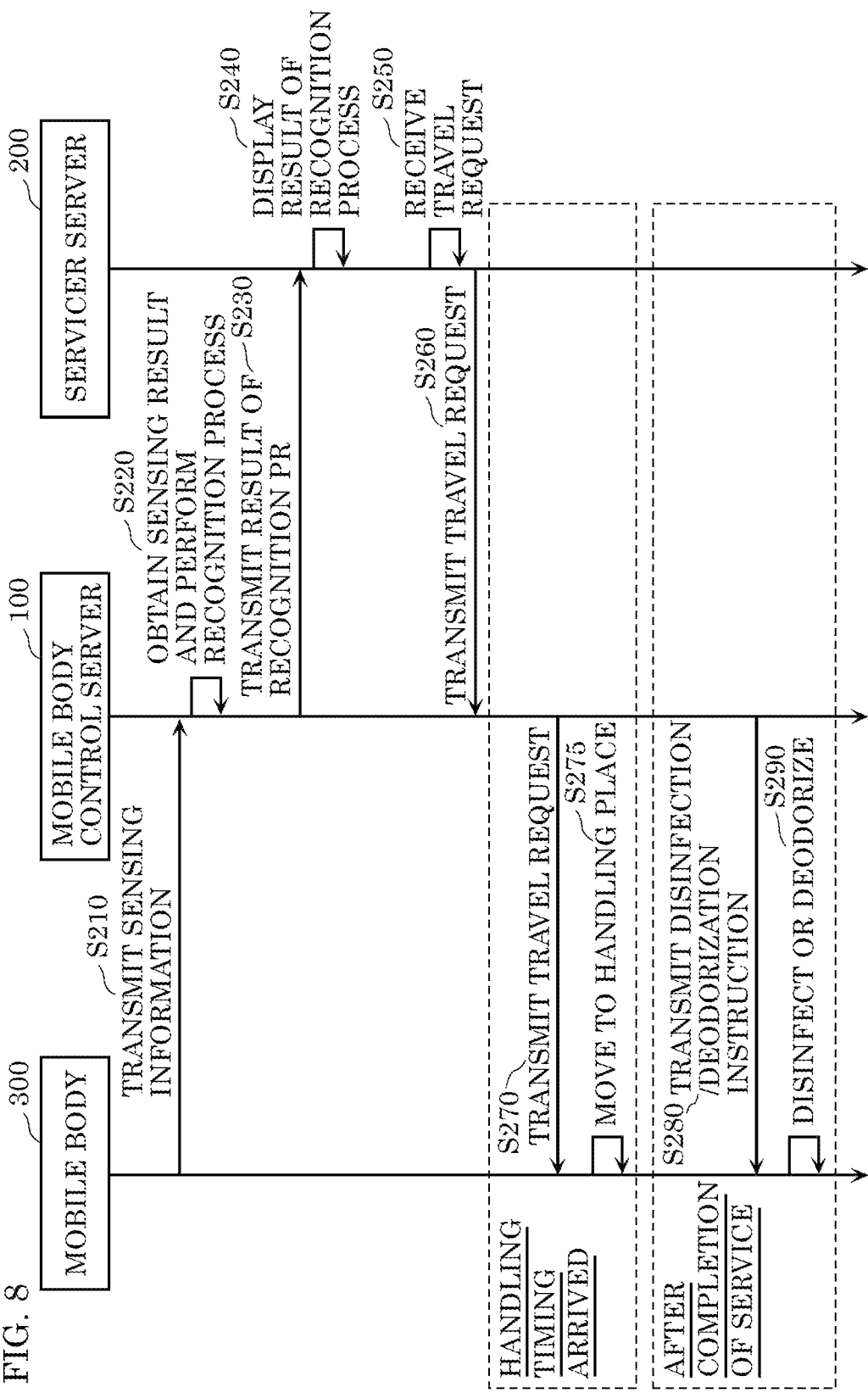
FIG. 8 is a sequence chart of a second mobile body control process according to an embodiment.

FIG. 8 is a sequence chart of the second mobile body control process.

Among the processes illustrated in FIG. 8, the process in Step S210 to the process in Step S240 are substantially the same as the process in Step S110 to the process in Step S140 in the handling timing setting input process, respectively. The process in Step S275 to the process in Step S290 are substantially the same as the process in Step S30 to the process in Step S50 in the first mobile body control process, respectively. Therefore, here, detailed explanations of the process in Step S210 to the process in Step S240 and the process in Step S275 to the process in Step S290 will be omitted assuming that the explanations have already been provided, and the following description will focus on the process in Step S250 to the process in Step S270.

After the process in Step S240 is completed, when a user who has checked the displayed result of the recognition process enters, on operating unit 22, a travel request for movement of mobile body 300 to a handling place, operating unit 22 receives the travel request (Step S250).

When the travel request is received, communicator 23 transmits the travel request to mobile body control server 100 (Step S260).

When the travel request is transmitted, communicator 13 in mobile body control server 100 receives the transmitted travel request and transmits the received travel request to mobile body 300 (Step S270).

When the process in Step S270 is completed, information processing system 1 proceeds to the process in step S275.

[3. Review]

As described above, according to the above information processing system 1, handling timing for handling at least one of dirt and damage inside mobile body 300 is determined from the result of sensing the interior of mobile body 300, and a notification for mobile body 300 to move to a handling place according to the determined handling timing is output. Thus, the dirt or the damage inside mobile body 300 can be handled at the appropriate timing.

OTHER EMBODIMENTS

Although the information processing system according to one or more aspects of the present disclosure has been thus far described based on the embodiment, the present disclosure is not limited to this embodiment. Various modifications to the present embodiment that can be conceived by those skilled in the art, and forms configured by combining structural elements in different embodiments, without departing from the teachings of the present disclosure may be included in one or more aspects of the present disclosure.

(1) In the embodiment, information processing system 1 is described as being configured to perform the first mobile body control process as one example. In this regard, information processing system 1 may be configured to perform the third mobile body control process instead of the first mobile body control process, for example.

Hereinafter, the third mobile body control process will be described with reference to the drawings.

The third mobile body control process is a process performed by mobile body control server 100 to notify an owner or a manager of mobile body 300 of a recommendation on handling of the interior of mobile body 300 according to the result of sensing the interior of mobile body 300.

Figure 9:
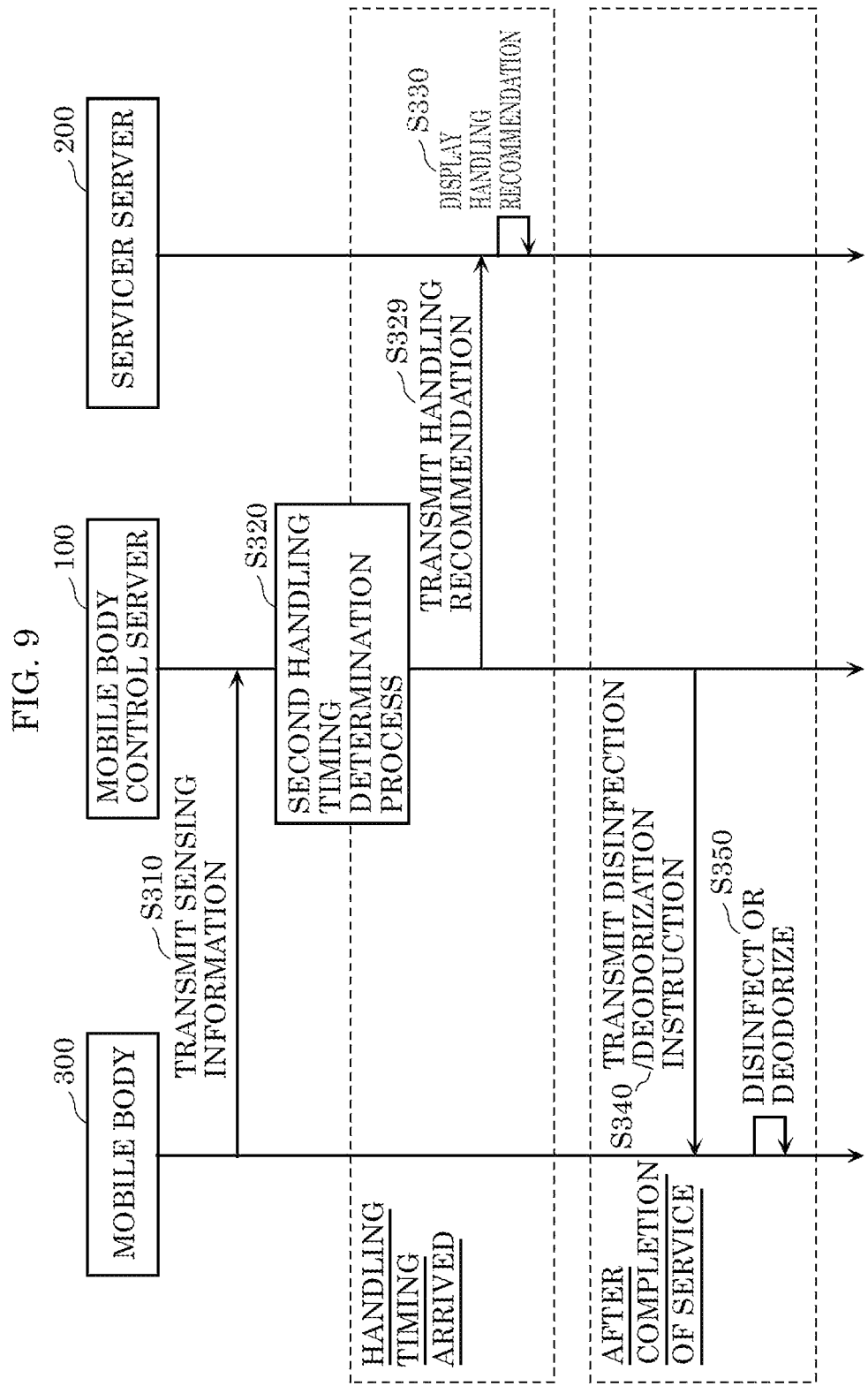
FIG. 9 is a sequence chart of a third mobile body control process according to another embodiment.

FIG. 9 is a sequence chart of the third mobile body control process.

Among the processes illustrated in FIG. 9, the process in Step S310 and the process in Step S340 to the process in Step S350 are substantially the same as the process in Step S10 and the process in Step S40 to the process in Step S50 in the first mobile body control process according to the embodiment, respectively. Therefore, here, detailed explanations of the process in Step S310 and the process in Step S340 to the process in Step S350 will be omitted assuming that the explanations have already been provided, and the following description will focus on the process in Step S320 to the process in Step S328.

When the sensing information is transmitted from mobile body 300 in the process in Step S310, communicator 13 in mobile body control server 100 receives the sensing information. When the sensing information is received, mobile body control server 100 starts the second handling timing determination process (Step S320).

Figure 10:
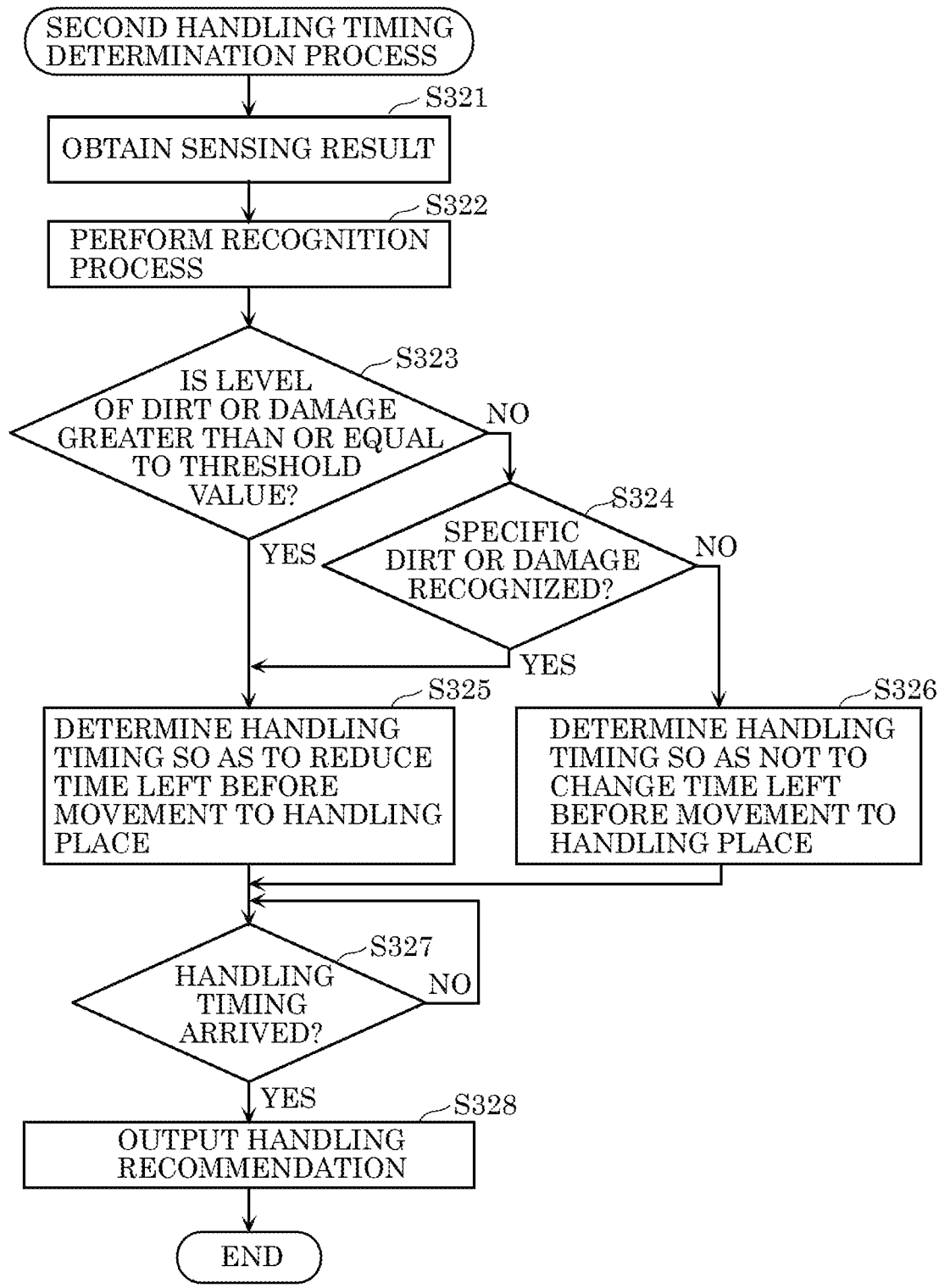
FIG. 10 is a flowchart of a second handling timing determination process according to another embodiment.

FIG. 10 is a flowchart of the second handling timing determination process.

Among the processes illustrated in FIG. 10, the process in Step S321 to the process in Step S327 are substantially the same as the process in Step S21 to the process in Step S27 in the first handling timing determination process according to the embodiment, respectively. Therefore, here, detailed explanations of the process in Step S321 to the process in Step S327 will be omitted assuming that the explanations have already been provided, and the following description will focus on the process in Step S329 to the process in Step S330.

When the determined handling timing comes in the process in Step S327 (YES in Step S327), handling timing determination unit 60 outputs a recommendation for an owner or a manager of mobile body 300 on handling of the interior of mobile body 300 (Step S328).

When the process in Step S328 is completed, mobile body control server 100 ends the second handling timing determination process.

Returning to FIG. 9, the following continues to describe the second mobile body control process.

In mobile body control server 100, when the second handling timing determination process (Step S320) is completed, communicator 13 transmits, to servicer server 200, the recommendation for the owner or the manager of mobile body 300 on handling of the interior of mobile body 300 that has been output from handling timing determination unit 60 (Step S329).

When the recommendation on handling of the interior of mobile body 300 is transmitted, communicator 23 in servicer server 200 receives the recommendation on handling of the interior of mobile body 300. Subsequently, display 21 displays the received recommendation on handling of the interior of mobile body 300 (Step S330).

(2) In the embodiment, information processing system 1 is described as being configured to include two servers, namely, mobile body control server 100 and servicer server 200 as one example. However, information processing system 1 is not necessarily limited to the example of being configured to include mobile body control server 100 and servicer server 200 as long as substantially the same function as the function provided by mobile body control server 100 and servicer server 200 can be provided. Information processing system 1 may, for example, be configured to include one server capable of providing substantially the same function as the function provided by mobile body control server 100 and servicer server 200. For example, information processing system 1 may be configured to include three or more servers capable of providing, by operating in coordination with one another, substantially the same function as the function provided by mobile body control server 100 and servicer server 200.

(3) In the embodiment, information processing system 1 is described as being configured such that mobile body control server 100 performs the recognition process and determines the handling timing. However, information processing system 1 does not necessarily need to be limited to the configuration in which mobile body control server 100 performs the recognition process and determines the handling timing as long as the recognition process can be performed and the handling timing can be determined. For example, information processing system 1 may be configured such that mobile body 300 partially or entirely performs the recognition process or may be configured such that mobile body 300 partially or entirely performs the process of determining the handling timing.

(4) Some or all of the structural elements included in mobile body control server 100, servicer server 200, and mobile body 300 may be one system LSI (Large Scale Integration: large scale integrated circuit). The system LSI is a super multifunctional LSI manufactured by integrating a plurality of components onto a single chip. Specifically, the system LSI is a computer system configured of a microprocessor, read-only memory (ROM), random-access memory (RAM), and so on. A computer program is stored in the ROM. The system LSI achieves its function as a result of the microprocessor operating according to the computer program.

Note that although a system LSI is mentioned here, there are instances where the designations IC, LSI, super LSI, and ultra LSI are used depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(5) One aspect of the present disclosure may be not only the information processing system described above, but also an information processing method including, as steps, characteristic components included in the information processing system. Furthermore, one aspect of the present disclosure may also be a computer program for causing a computer to execute the respective characteristic steps included in the information processing method. Moreover, one aspect of the present disclosure may also be a non-transitory computer-readable recording medium on which this sort of computer program is recorded.

(6) In an embodiment, each of the structural elements may be configured in the form of an exclusive hardware product or may be implemented by executing a software program suitable for the structural element. Each of the structural elements may be implemented by a program executor such as a central processing unit (CPU) or a processor reading and executing the software program recorded on a recording medium such as a hard disk or a semiconductor memory.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely used in systems that operate mobile bodies.

What is claimed is:

1. An information processing method, comprising the following executed by a computer:
    obtaining, from a database, timing information indicating a timing for repairing an interior of an autonomous vehicle, wherein the timing information indicates
        (i) a predetermined timing for performing the repairing, or
        (ii) a predetermined cycle in which the repairing is performed in a case where the repairing is performed a plurality of times;
    obtaining sensing information from sensors inside the autonomous vehicle, wherein the sensing information indicates an image of a space including a seat inside the autonomous vehicle, the image being captured by a camera serving as one of the sensors;
    recognizing a damage inside the autonomous vehicle, based on the sensing information;
    calculating a level of the damage recognized inside the autonomous vehicle;
    determining a handling timing for handling of the damage recognized, based on (i) the timing information and (ii) the calculated level of the damage, wherein the handling timing is a timing that is a certain time earlier than a timing determined based on the timing information to perform the repairing, wherein the certain time is determined using a predetermined time corresponding to the level of the damage, wherein the corresponding predetermined time increases as the level of the damage increases; and
    causing the autonomous vehicle to move to a handling place by transmitting, to the autonomous vehicle, a travel request for the autonomous vehicle to move to the handling place according to the handling timing, wherein
    the information processing method further causes the computer to execute:
    determining whether the level of the damage is greater than or equal to a first threshold value, wherein
    in the determining, when it is determined that the level of the damage is greater than or equal to the first threshold value, the handling timing to handle the damage is determined,
    the database further stores information indicating a predetermined time slot, and
    in the determining, when a current time is included in the predetermined time slot,
whether or not the level of the damage is greater than or equal to a second threshold value is determined, wherein the second threshold value is greater than the first threshold value, and
    in the determining, the handling timing to handle the damage, whose level of the damage is determined as being greater than or equal to the second threshold value, is determined.

2. The information processing method according to claim 1, wherein
    the handling timing is determined when the recognizing is performed.

3. The information processing method according to claim 1, wherein
    when no passenger or freight is present in the autonomous vehicle, the autonomous vehicle is caused to move to the handling place by the computer transmitting the travel request to the autonomous vehicle.

4. The information processing method according to claim 1, wherein in the recognizing, a kind of the damage is identified, and a handling method for handling the identified kind of the damage is identified, and in the calculating, the level is calculated based on the handling method identified.

5. The information processing method according to claim 1, wherein in the recognizing, a kind of the damage is identified, and a handling cost for handling the identified kind of the damage is identified, the handling cost is time or fee required for handling the identified kind of the damage, and in the calculating, the level is calculated based on the handling cost identified.

6. The information processing method according to claim 1, wherein the handling timing is determined based on whether or not a kind of the damage recognized in the recognizing deteriorates over time.

7. The information processing method according to claim 1, wherein the information processing method further causes the computer to execute:

causing a display used by a user to display the result of the recognizing on a display screen of the display; and causing the display to display, on the display screen, a screen on which a handling timing setting is to be entered.

8. The information processing method according to claim 1, wherein the information processing method further causes the computer to execute:

outputting recommendation information for recommending a handling of the damage according to the timing, to cause a display used by an owner or a manager of the autonomous vehicle to display the recommendation information on a display screen of the display.

9. The information processing method according to claim 1, wherein the information processing method further causes the computer to execute:

determining the handling timing according further to a characteristic of a passenger toward the damage, the passenger being scheduled to ride the autonomous vehicle.

10. The information processing method according to claim 1, wherein the information processing method further causes the computer to execute:

obtaining information indicating whether or not an apparatus that the autonomous vehicle includes to handle the damage has operated, wherein in the determining, the handling timing is determined according further to whether or not the apparatus has operated.

11. An information processing device, comprising:

a processor; and a memory storing a program, wherein, when the program is executed by the processor, the program causes the processor to execute:

obtaining, from a database, timing information indicating a timing for repairing an interior of an autonomous vehicle, wherein the timing information indicates (i) a predetermined timing for performing the repairing, or (ii) a predetermined cycle in which the repairing is performed in a case where the repairing is performed a plurality of times;

obtaining sensing information from sensors inside the autonomous vehicle, wherein the sensing information indicates an image of a space including a seat inside the autonomous vehicle, the image being captured by a camera serving as one of the sensors;

recognizing a damage inside the autonomous vehicle, based on the sensing information;

calculating a level of the damage recognized inside the autonomous vehicle;

determining a handling timing for handling of the damage recognized, based on (i) the timing information and (ii) the calculated level of the damage, wherein the handling timing is a timing that is a certain time earlier than a timing determined based on the timing information to perform the repairing, wherein the certain time is determined using a predetermined time corresponding to the level of the damage, wherein the corresponding predetermined time increases as the level of the damage increases; and causing the autonomous vehicle to move to a handling place by transmitting, to the autonomous vehicle, a travel request for the autonomous vehicle to move to the handling place according to the handling timing, wherein the processor which executes the program further performs:

determining whether the level of the damage is greater than or equal to a first threshold value, wherein in the determining, when it is determined that the level of the damage is greater than or equal to the first threshold value, the handling timing to handle the damage is determined, the database further stores information indicating a predetermined time slot, and in the determining, when a current time is included in the predetermined time slot, whether or not the level of the damage is greater than or equal to a second threshold value is determined, wherein the second threshold value is greater than the first threshold value, and in the determining, the handling timing to handle the damage, whose level of the damage is determined as being greater than or equal to the second threshold value, is determined.

12. A non-transitory computer-readable recording medium having recorded thereon a program for causing a computer to execute obtaining, from a database, timing information indicating a timing for repairing an interior of an autonomous vehicle, wherein the timing information indicates (i) a predetermined timing for performing the repairing, or (ii) a predetermined cycle in which the repairing is performed in a case where the repairing is performed a plurality of times;

obtaining sensing information from sensors inside the autonomous vehicle, wherein the sensing information indicates an image of a seat inside the autonomous vehicle, the image being captured by a camera serving as one of the sensors;

recognizing a damage inside the autonomous vehicle, based on the sensing information;

calculating a level of the damage recognized inside the autonomous vehicle;

determining a handling timing for handling of the damage recognized, based on (i) the timing information and (ii) the calculated level of the damage, wherein the handling timing is a timing that is a certain time earlier than a timing determined based on the timing information to perform the repairing, wherein the certain time is determined using a predetermined time corresponding to the level of the damage, wherein the corresponding predetermined time increases as the level of the damage increases; and causing the autonomous vehicle to move to a handling place by transmitting, to the autonomous vehicle, a travel request for the autonomous vehicle to move to the handling place according to the handling timing, wherein the processor which executes the program further performs:

determining whether the level of the damage is greater than or equal to a first threshold value, wherein in the determining, when it is determined that the level of the damage is greater than or equal to the first threshold value, the handling timing to handle the damage is determined, the database further stores information indicating a predetermined time slot, and in the determining, when a current time is included in the predetermined time slot, whether or not the level of the damage is greater than or equal to a second threshold value is determined, wherein the second threshold value is greater than the first threshold value, and in the determining, the handling timing to handle the damage, whose level of the damage is determined as being greater than or equal to the second threshold value, is determined.

13. The information processing method according to claim 1, wherein the damage is a damage on the seat, a floor, or a window in the space which is recognized based on image of the space including the seat as the sensing information.

14. The information processing method according to claim 13, wherein the damage on the seat is fraying of fabric of the seat or a hole in the seat.

15. The information processing method according to claim 1, wherein the autonomous vehicle includes a sterilization equipment which executes sterilizing inside of the autonomous vehicle, and the information processing method further causes the computer to execute:

transmitting an instruction for executing the sterilizing to the autonomous vehicle, to cause the sterilization equipment to execute the sterilizing, or the autonomous vehicle includes a deodorization equipment which executes deodorizing inside of the autonomous vehicle, and the information processing method further causes the computer to execute:

transmitting an instruction for executing the deodorizing to the autonomous vehicle, to cause the deodorization equipment to execute the deodorizing.

16. The information processing method according to claim 1, wherein the information indicating the predetermined time slot is information indicating (i) information indicating a time slot in which it is rainy, extremely hot, or extremely cold, or (ii) a time slot in which a predetermined event is held.

* * * * *